US009518635B2

(12) United States Patent
Beck

(10) Patent No.: US 9,518,635 B2
(45) Date of Patent: Dec. 13, 2016

(54) MULTI-SPEED TRANSMISSION

(71) Applicant: ZF Friedrichshafen AG, Friedrichshafen (DE)

(72) Inventor: Stefan Beck, Eriskirch (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/443,815

(22) PCT Filed: Oct. 10, 2013

(86) PCT No.: PCT/EP2013/071157
§ 371 (c)(1),
(2) Date: Sep. 2, 2015

(87) PCT Pub. No.: WO2014/075851
PCT Pub. Date: May 22, 2014

(65) Prior Publication Data
US 2016/0017959 A1 Jan. 21, 2016

(30) Foreign Application Priority Data
Nov. 19, 2012 (DE) .................. 10 2012 221 073

(51) Int. Cl.
*F16H 3/62* (2006.01)
*F16H 3/66* (2006.01)
*F16H 3/44* (2006.01)

(52) U.S. Cl.
CPC ........... *F16H 3/66* (2013.01); *F16H 2003/445* (2013.01); *F16H 2200/0065* (2013.01); *F16H 2200/201* (2013.01); *F16H 2200/2046* (2013.01)

(58) Field of Classification Search
CPC ...... F16H 3/66; F16H 2200/0065; F16H 3/72; F16H 2003/445; F16H 2200/2046; F16H 2200/201
See application file for complete search history.

(56) References Cited

U.S. PATENT DOCUMENTS 7,717,819 B2 * 5/2010 Wittkopp .................. F16H 3/66
475/218
7,883,440 B2 * 2/2011 Phillips ..................... F16H 3/66
475/275

(Continued)

FOREIGN PATENT DOCUMENTS

| DE | 20 2008 004052 | 5/2008 |
| DE | 10 2009 018598 | 2/2011 |
| DE | 10 2009 028670 | 2/2011 |

OTHER PUBLICATIONS

German Patent Office Search Report, Jul. 16, 2013.
PCT Search Report and Written Opinion, Dec. 20, 2013.

*Primary Examiner* — David J Hlavka
(74) *Attorney, Agent, or Firm* — Dority & Manning, P.A.

(57) ABSTRACT

A multi-stage, space-saving transmission comprises a drive shaft and an output shaft arranged parallel to each other, at least eight other rotating shafts, three planetary gear sets, three spur gear stages, and six elements, comprising two brakes and four clutches. Selective meshing of the six elements brings about nine forward gears and one reverse gear. The first planetary gear set is coaxial to a first axis, defined by the drive shaft, and the second and third planetary gear sets are coaxial to a second axis, defined by the output shaft.

36 Claims, 8 Drawing Sheets

(56) References Cited

U.S. PATENT DOCUMENTS

| | | | |
|---|---|---|---|
| 7,946,945 B1* | 5/2011 | Wittkopp | F16H 3/66 475/218 |
| 8,167,753 B2 | 5/2012 | Wittkopp et al. | |
| 2009/0082157 A1* | 3/2009 | Wittkopp | F16H 3/66 475/218 |
| 2009/0082158 A1* | 3/2009 | Wittkopp | F16H 3/666 475/218 |
| 2009/0082160 A1* | 3/2009 | Phillips | F16H 3/666 475/218 |
| 2009/0082163 A1* | 3/2009 | Phillips | F16H 3/66 475/275 |
| 2009/0082164 A1* | 3/2009 | Wittkopp | F16H 3/66 475/276 |
| 2009/0082167 A1 | 3/2009 | Wittkopp et al. | |
| 2010/0248883 A1* | 9/2010 | Wittkopp | B60K 6/365 475/5 |
| 2010/0248891 A1* | 9/2010 | Wittkopp | B60K 6/365 477/3 |
| 2014/0113765 A1* | 4/2014 | Noh | F16H 3/62 475/302 |

* cited by examiner

| Gear | Locked Shifting Elements | | | | | | Transmission Ratio | Gear Step |
|---|---|---|---|---|---|---|---|---|
| | Brake | | Clutch | | | | | |
| | 03 | 04 | 13 | 17 | 18 | 35 | i | φ |
| 1 | | x | | x | | x | 4,168 | |
| 2 | x | x | | x | | | 2,575 | 1,619 |
| 3 | | x | x | x | | | 1,811 | 1,422 |
| 4 | | x | | x | x | | 1,356 | 1,336 |
| 5 | | | x | x | x | | 1,000 | 1,356 |
| 6 | x | | | x | x | | 1,812 | 1,232 |
| 7 | | | | x | x | x | 0,693 | 1,172 |
| 8 | x | | | | x | x | 0,561 | 1,235 |
| 9 | | | x | | x | x | 0,463 | 1,212 |
| R | | x | x | | | x | -3,779 | Spreizung: 9,002 |
| M4' | | x | | | x | x | 1,356 | -0,907 |
| M4'' | | x | x | | x | | 1,356 | |
| M4''' | x | x | | | x | | 1,356 | |

Fig. 3

MULTI-SPEED TRANSMISSION

FIELD OF THE INVENTION

The present invention relates to a multi-speed transmission, in particular an automatic transmission for a motor vehicle.

BACKGROUND OF THE INVENTION

According to the state of the art, automatic transmissions, in particular for motor vehicles, comprise planetary gear sets that are shifted by means of friction elements or shift elements and are typically connected to a start-up element that is subject to a slip effect and is alternatively provided with a lock-up clutch, such as a hydrodynamic torque converter or a fluid coupling.

Such automatic transmissions are often described in the state of the art and are subject to continuous development and improvement. Such transmissions should feature a sufficient number of forward gears along with at least one reverse gear and a transmission ratio that is very well suited for motor vehicles, with a high overall spread and favorable progressive steps. Furthermore, they should enable a high starting transmission ratio in the forward direction, and contain a direct gear. In addition, automatic transmissions require low construction costs and a small number of shift elements, whereas, upon a sequential shifting operation, only one shift element is to be switched on, and only one shift element is to be switched off.

Such an automatic transmission is known, for example, from DE 10 2009 028 670 A1. It includes four planetary gear sets arranged behind one another, coaxial to the main axis of rotation, and six shift elements for the shifting of at least nine forward transmission gears and one reverse gear.

With the known transmission, a fourth shaft is connected to the sun gear of the first planetary gear set and the sun gear of the second planetary gear set, is attachable to the housing of the transmission through a first brake and is detachably connectable to the drive shaft through a first clutch, whereas the drive shaft is detachably connectable, through a second clutch, to a seventh shaft connected to the ring gear of the second planetary gear set and, through a third clutch, to an eighth shaft, which is connected to the ring gear of the third planetary gear set and the bar of the fourth planetary gear set and is attachable to the housing through a second brake.

Furthermore, with the known transmission, it is provided that the ring gear of the first planetary gear set is connected to a sixth shaft connected to the bar of the second planetary gear set and the ring gear of the fourth planetary gear set, whereas a third shaft is connected to the sun gear of the third planetary gear set and the sun gear of the fourth planetary gear set and is attachable to the housing through a third brake, and whereas the output shaft is connected to the bar of the third planetary gear set. However, in an adverse manner, the transmission in accordance with DE 10 2009 028 670 A1 is not suitable for installation as a front-transverse system.

Furthermore, a multi-speed hybrid transmission emerges from DE 10 2010 010 122 A1, which comprises an input element, an output element, a first, second and third planetary gear set, each of which features a first, second and third element, whereas the gear sets are arranged along a first and second axis, and a first, second and third outer gear set, which are arranged for the transfer of turning moment between the first and second axes, whereas each of the first, second and third outer gear sets includes the first and second meshing outer gears. The known transmission also includes a motor/generator that is functionally connected to the first outer gear of the second outer gear set, along with five turning moment transfer devices for selectively connecting the elements of the planetary gear sets or of the first and second outer gear with each other, with a fixed element, with the input element or other elements of the planetary gear sets, whereas the five turning moment transfer devices are engaged in combinations of three, in order to produce at least eight forward gears and one reverse gear between the input element and output element.

The present invention is based on the task of, starting from a transmission in accordance with DE 10 2009 028 670 A1, specifying a multi-stage transmission that, viewed axially, features a low need for installation space, such that the installation of the transmission and, optionally, a hybridization of the transmission as a front-transverse system is possible.

SUMMARY OF THE INVENTION

In accordance with the invention, the tasks are solved by the characteristics of the transmission embodiments described and depicted herein. Additional objects and advantages of the invention will be set forth in part in the following description, or may be obvious from the description, or may be learned through practice of the invention.

Accordingly, a multi-speed transmission is proposed, which features one drive shaft and one output shaft, which are arranged in a housing and parallel to each other. Furthermore, the transmission includes three planetary gear sets, hereinafter referred to as the first, second and third planetary gear set, whereas one planetary gear set is arranged coaxial to a first axis, which is defined by the drive shaft, and two planetary gear sets are arranged coaxial to a second axis, which is arranged parallel to the first axis and is defined by the output shaft, at least ten rotating shafts (hereafter referred to as the drive shaft, output shaft, third, fourth, fifth, sixth, seventh, eighth, ninth and tenth shaft), a first, a second and a third spur gear stage and six shift elements, comprising two brakes and four clutches, the selective meshing of which brings about different transmission ratio relationships between the drive shaft and the output shaft, such that, preferably, nine forward gears and one reverse gear can be realized.

The planetary gear sets are preferably formed as negative planetary gear sets. As is well-known, a simple negative planetary gear set comprises a sun gear, a ring gear and a bar, on which the planetary gears are rotatably mounted, each of which meshes with the sun gear and the ring gear. Thereby, with a bar that is held down, the ring gear exhibits a direction of rotation opposite to the sun gear. By contrast, a simple positive planetary gear set comprises a sun gear, a ring gear and a bar, on which the inner and outer planetary gears are rotatably mounted, whereas all inner planetary gears mesh with the sun gear, and all outer planetary gears mesh with the ring gear, whereas each inner planetary gear meshes with each outer planetary gear. Thereby, with a bar that is held down, the ring gear exhibits the same direction of rotation as the sun gear, and a positive stationary transmission ratio arises.

Given the fact that one planetary gear set of the transmission is arranged coaxial to a first axis, which is defined by the drive shaft and two planetary gear sets, preferably that the second and third planetary gear sets are arranged coaxial to a second axis, which is arranged parallel to a first axis and is defined by the output shaft, a very short construction length is obtained, such that the transmission can be installed in front-transverse design. Preferably, viewed radially, the first planetary gear set is arranged above the third planetary gear set and the second planetary gear set is arranged above the fourth planetary gear set.

In accordance with a first embodiment of the invention, the drive shaft can be in operative connection, through an eighth shaft and a ninth shaft, through a third clutch or a fifth clutch, and through a first spur gear stage, with the ring gear of the second planetary gear set and the bar of the third planetary gear set, and is detachably connectable through a first clutch to a third shaft connected to the sun gear of the first planetary gear set, which is attachable to the housing of the transmission through a first brake, and can be in operative connection, through a fourth clutch or sixth clutch, a fifth shaft and a tenth shaft and a third spur gear stage, with the ring gear of the third planetary gear set. In addition, the drive shaft is detachably connectable, through a second clutch, to a seventh shaft connected to the ring gear of the first planetary gear set.

Furthermore, a sixth shaft is connected to the bar of the first planetary gear set and, through a second spur gear stage, is in operative connection with the tenth shaft connected to the ring gear of the third planetary gear set, whereas the output shaft is connected to the bar of the second planetary gear set, and the fourth shaft is connected to the sun gear of the second planetary gear set and the sun gear of the third planetary gear set and attachable to the housing through a second brake.

Within the framework of an additional form of the invention, the drive shaft is detachably connectable to the eighth shaft through a third clutch, which, through a first spur gear stage, is in operative connection with the ninth shaft connected to the ring gear of the second planetary gear set and the bar of the third planetary gear set.

Alternatively, the drive shaft can be in operative connection through the first spur gear stage with the eighth shaft, which is detachably connectable, through a fifth clutch, to the ninth shaft connected to the ring gear of the third planetary gear set and the bar of the fourth planetary gear set, whereas the third clutch is eliminated. Through this arrangement variant, with which the fourth clutch is arranged coaxial to the second axis, axial installation space along the first axis can be saved.

In addition, the third shaft can be detachably connectable through a fourth clutch to the fifth shaft, which is in operative connection, through a third spur gear stage, with the tenth shaft connected to the ring gear of the third planetary gear set. Alternatively, the third shaft can be in operative connection through the third spur gear stage with the fifth shaft, which is detachably connectable, through a sixth clutch, to the tenth shaft connected to the ring gear of the third planetary gear set, whereas the fourth clutch is eliminated. Thereby, the sixth clutch is arranged coaxial to the second axis, such that, in an advantageous manner, axial installation space along the first axis can be saved.

The alternative versions of the operative connection of the drive shaft with the ring gear of the second planetary gear set and the bar of the third planetary gear set and the operative connection of the third shaft with the ring gear of the third planetary gear set can be combined with each other.

Within the framework of additional embodiments of the invention, it can be provided that, starting from the described structure of a transmission in accordance with the invention, the drive shaft is directly connected to the ring gear of the first planetary gear set and is not detachably connectable through the second clutch and a seventh shaft, whereas the second clutch is eliminated. Thereby, the third shaft is detachably connectable, through a seventh clutch, to a seventh shaft connected to the sun gear of the first planetary gear set, or the sixth shaft is detachably connectable, through an eighth clutch, to a seventh shaft connected to the bar of the first planetary gear set. Alternatively, the sixth shaft can be in operative connection, through the second spur gear stage, with a seventh shaft, which is detachably connectable, through a ninth clutch, to the tenth shaft connected to the ring gear of the third planetary gear set.

Preferably, the transmission ratio of the first and second spur gear stage of the transmission amounts to 1.0.

Through the arrangement of the multi-stage transmission in accordance with the invention, transmission ratios that are particularly suitable for passenger cars along with an increased overall spread of the multi-speed transmission arise, which results in an improvement in driving comfort and a significant reduction in consumption.

Moreover, with the multi-speed transmission in accordance with the invention, construction costs are significantly reduced, due to the low number of shift elements, which has positive effects on weight and costs. In an advantageous manner, with the multi-speed transmission in accordance with the invention, it is possible to perform a start with a hydrodynamic converter, an external starting clutch or other suitable external start-up elements. It is also possible to enable the start-up procedure with a start-up element integrated into the transmission. A shift element that is actuated in the first forward gear and in the reverse gear is preferably suitable.

Furthermore, the multi-speed transmission in accordance with the invention gives rise to good efficiency in the main driving gears with respect to drag losses and gearing losses.

There are low torques on the shift elements and on the planetary gear sets of the multi-speed transmission, which reduces wear in an advantageous manner. In addition, the low torques enable correspondingly low dimensioning, which also reduces the required installation space and the corresponding costs. Furthermore, there are also low rotational speeds for the shafts, the shift elements and the planetary gear sets.

In addition, the transmission in accordance with the invention is designed in such a manner that, viewed axially, the need for installation space is low, which enables a hybridization of the transmission as a front-transverse system.

BRIEF DESCRIPTION OF THE DRAWINGS

In the following, the invention is more specifically illustrated as an example on the basis of the attached figures. The following are shown in these:

FIG. 3 is an exemplary shift diagram for a multi-speed transmission in accordance with FIGS. 1 and 2;

DETAILED DESCRIPTION

Figure 1:
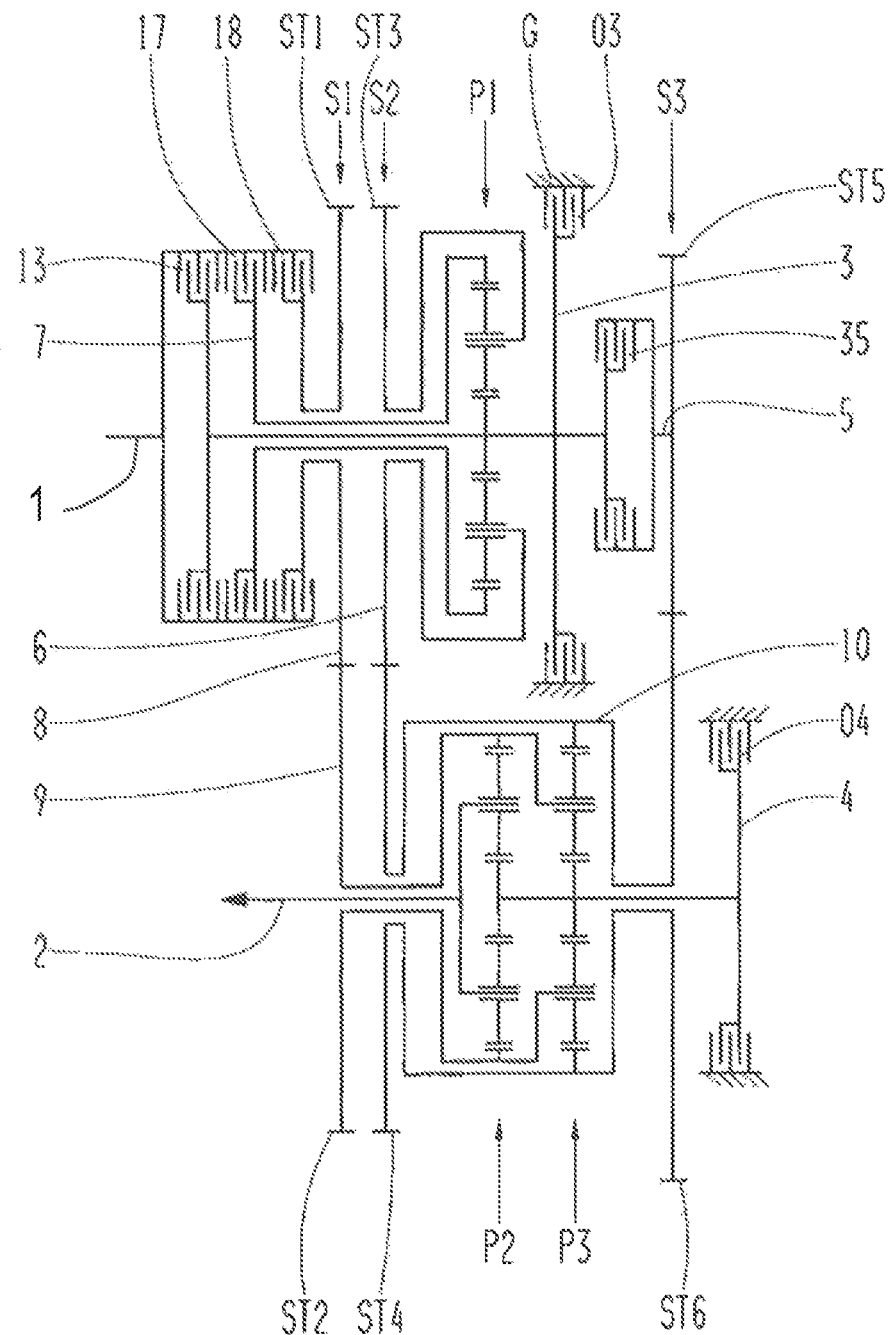
FIG. 1 is a schematic view of a first preferred embodiment of a multi-speed transmission in accordance with the invention.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 shows a multi-stage transmission in accordance with the invention, with a first planetary gear set P1, a second planetary gear set P2 and a third planetary gear set P3, whereas the planetary gear set P1 is defined coaxial to a first axis, which is defined by the drive shaft 1, and the second and third planetary gear sets P2, P3 are arranged coaxial to a second axis, which is arranged parallel to the first axis and is defined by the output shaft 2.

In the example shown, the planetary gear sets P1, P2, P3 are designed as negative planetary gear sets. Thereby, at least one planetary gear set of the transmission can be designed as a positive planetary gear set, if the bar connection and the ring gear connection are exchanged at the same time and the amount of the stationary transmission ratio compared to the design as a negative planetary set is increased by 1.

As shown in FIG. 1, six shift elements (i.e., two brakes 03, 04 and four clutches 13, 17, 18 and 35) are provided. The clutches and the brakes of the transmission are preferably designed as frictional shift elements or multi-disk shift elements, but may also be designed as positive-locking shift elements.

With these shift elements, a selective shifting of nine forward gears and one reverse gear can be realized. The multi-stage transmission in accordance with the invention features a total of at least ten rotating shafts, whereas the drive shaft forms the first shaft 1 and the output shaft forms the second shaft 2 of the transmission.

In accordance with the invention, with the multi-speed transmission in accordance with FIG. 1, it is provided that the drive shaft 1 is detachably connectable to an eighth shaft 8 through a first clutch 18, which, through a first spur gear stage S1, the first spur gear of which is designated with ST1 and the second spur gear of which is designated with ST2, is in operative connection with a ninth shaft 9 connected to the ring gear of the second planetary gear set P2 and the bar of the third planetary gear set P3. In addition, the drive shaft 1 is detachably connectable, through a first clutch 13, with a third shaft 3 connected to the sun gear of the first planetary gear set P1, whereas the third shaft 3 is attachable to the housing G of the transmission through a first brake 03 and is detachably connectable to a fifth shaft 5 through a fourth clutch 35, which, through a third spur gear stage S3, the first spur gear of which is designated with ST5 and the second spur gear of which is designated with ST6, is in operative connection with a tenth shaft 10 connected to the ring gear of the third planetary gear set P3. As shown in FIG. 1, with the example shown, the drive shaft 1 is, through a second clutch 17, detachably connectable to a seventh shaft 7 connected to the ring gear of the first planetary gear set P1.

With reference to FIG. 1, a sixth shaft 6 is connected to the bar of the first planetary gear set P1 and, through a second spur gear stage S2, the first spur gear of which is designated with ST3 and the second spur gear of which is designated with ST4, is in operative connection with the tenth shaft 10 connected to the ring gear of the third planetary gear set P3, whereas the output shaft 2 is connected to the bar of the second planetary gear set P2 and a fourth shaft 4 is connected to the sun gear of the second planetary gear set P2 and the sun gear of the third planetary gear set P3 and is attachable to the housing G through a second brake 04.

Thereby, the first, second, third and fourth clutches 13, 17, 18, 35 and the first brake 03 are arranged coaxial to the first axis, which is defined by the drive shaft 1.

Figure 2:
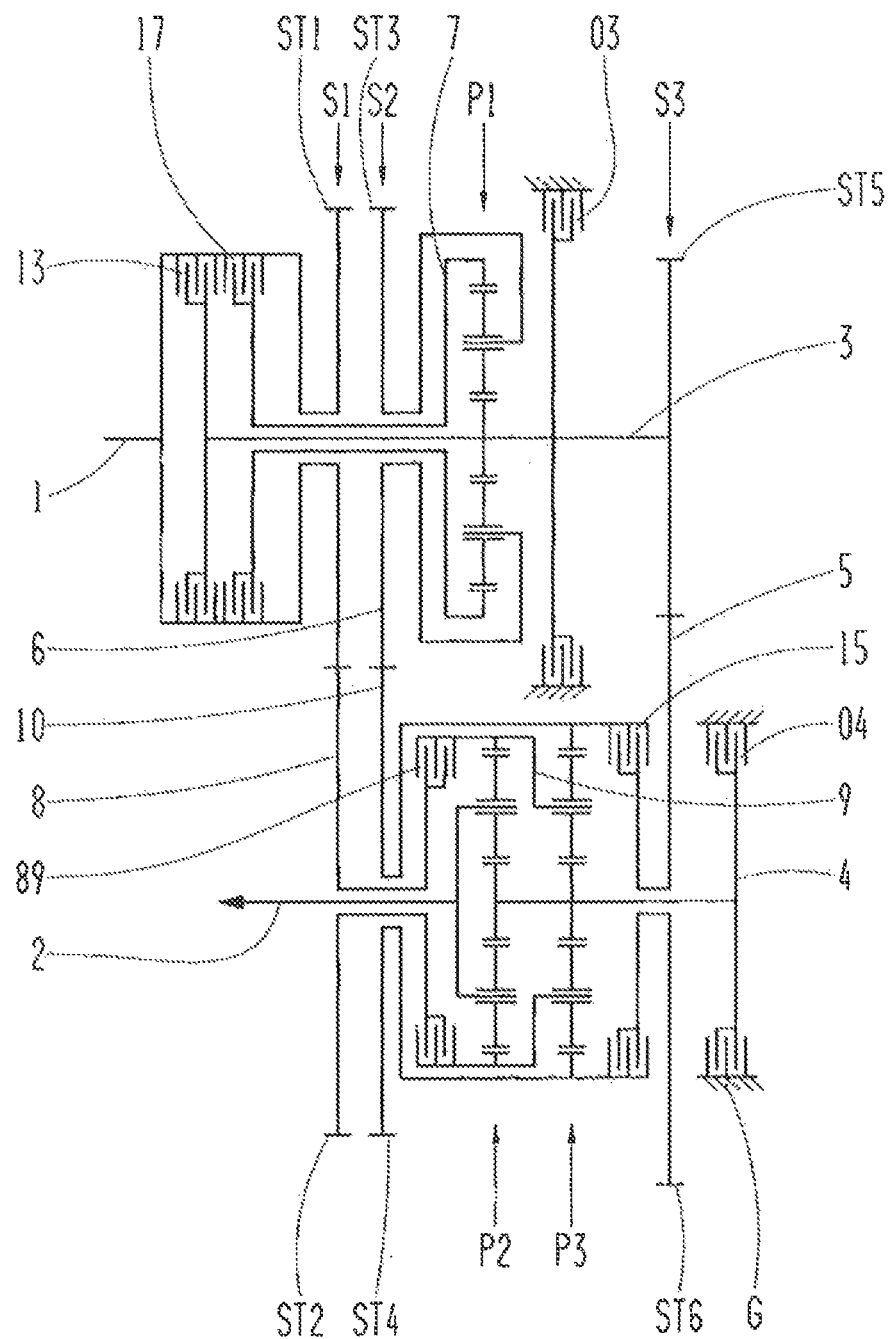
FIG. 2 is a schematic view of a second preferred embodiment of a multi-speed transmission in accordance with the invention.

The example shown in FIG. 2 differs from the embodiment according to FIG. 1 by the fact that, on the one hand, the drive shaft 1 is in operative connection, through the first spur gear stage S1, with the eighth shaft 8, which is detachably connectable, through a fifth clutch 89, to the ring gear of the second planetary gear set P2 and the bar of the third planetary gear set P3, whereas the third clutch 18 is eliminated. Such arrangement, with which the fifth clutch 89 is arranged around the second axis, which is defined by the output shaft 2, results in the advantage that axial installation space along the first axis can be saved.

In addition, the embodiment shown in FIG. 2 differs from the embodiment according to FIG. 1 by the fact that the third shaft 3 is in operative connection, through the third spur gear stage S3, to the fifth shaft 5, which, through a sixth clutch 15, is detachably connectable to the tenth shaft 10 connected to the ring gear of the third planetary gear set P3, whereas the fourth clutch 35 is eliminated. Through the arrangement of the sixth clutch 15 around the second axis, in an advantageous manner, axial installation space along the first axis can be saved.

With the example shown in FIG. 2, the first and second clutch 13, 17 and the first brake 03 are arranged coaxial to the first axis.

FIG. 3 shows an exemplary shift diagram of a multi-stage transmission in accordance with FIGS. 1 and 2. For each gear, three shift elements are locked. As an example, the respective transmission ratios i of the individual gears and the gear steps or progressive steps φ, to be determined from these, for the next higher gear can be seen in the shift diagram, whereas the value 9.002 represents the spread of the transmission.

For the example shown, the values for the stationary transmission ratios of the planetary gear sets P1, P2, P3 designed as negative planetary gear sets are −2.371, −2.808 and −2.981, respectively, whereas the transmission ratios of the first and second spur gear stages S1, S2 amount to 1.000 and the transmission ratio of the third spur gear stage amounts to 2.087. FIG. 3 shows that, upon a sequential shifting operation, only one shift element must be switched on, and only one shift element must be switched off, since two adjacent gears jointly use two shift elements. It also shows that a large spread is achieved with small gear jumps.

The first forward gear arises through the locking of the second brake 04 and the second and fourth clutches 17, 35, the second forward gear arises through the locking of the first and second brakes 03, 04 and the second clutch 17, the third forward gear arises through the locking of the second brake 04 and the first and second clutches 13, 17, the fourth forward gear arises through the locking of the second brake 04 and the second and third clutches 17, 18, the fifth forward gear, which in the example shown, is designed as a direct gear, arises through the locking of the first, second and third clutches 13, 17, 18, the sixth forward gear arises through the locking of the first brake 03 and the second and third clutches 17, 18, the seventh forward gear arises through the locking of the second, third and fourth clutches 17, 18, 35, the eighth gear arises through the locking of the first brake 03 and the third and fourth clutches 18, 35 and the ninth forward gear arises through the locking of the first, third, and fourth clutches 13, 18, 35, whereas the reverse gear arises through the locking of the second brake 04 and the first and fourth clutches 13, 35.

The fourth forward gear may alternatively be realized through the locking of the second brake 04 and the third and fourth clutches 18, 35, or through the locking of the second brake 04 and the first and third clutches 13, 18 or through the locking of the first and second brakes 03, 04 and the third clutch 18. In FIG. 3, such combinations are designated with M4', M4" or M4"', as the case may be.

For the embodiment shown in FIG. 2, the shift diagram differs from the shift diagram in FIG. 3 only by the fact that the third clutch 18 is replaced by the fifth clutch 89, and that the fourth clutch 35 is replaced by the sixth clutch 15.

Given the fact that the second brake 04 is locked in the first forward gear and in the reverse gear, this shift element is used as a start-up element.

In accordance with the invention, even with the same transmission scheme, different gear jumps arise depending on the shifting logic, such that an application-specific or vehicle-specific variation is enabled.

Figure 4:
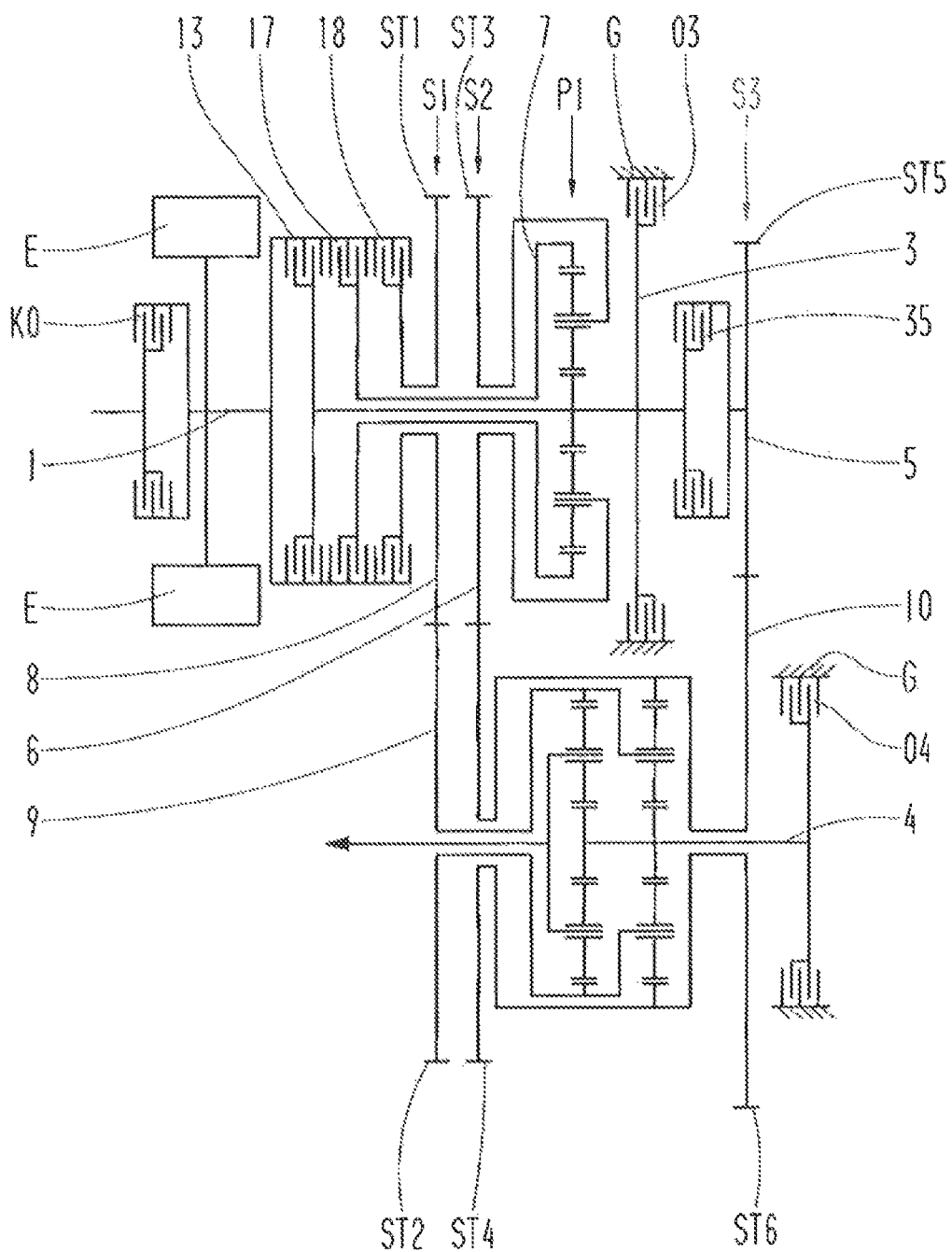
FIG. 4 is a schematic view of a hybridized multi-speed transmission based on the embodiment in accordance with FIG. 1.

The embodiment shown in FIG. 4 corresponds to the embodiment according to FIG. 1, with the difference that an electric motor E is provided, which is arranged on the drive shaft 1 of the transmission and is directly connected to the drive shaft 1. Thereby, optionally, a tenth clutch K0 can be provided, through which the internal combustion engine of the transmission that is not shown can be coupled, by which there can be all-electric driving in all gears of the transmission.

As an alternative to the direct connection of the electric motor E with the drive shaft 1, the electric motor can be arranged in an axially parallel manner to the drive shaft 1, and can be connected through a gear stage or a chain drive to the drive shaft 1. This arrangement is the subject matter of FIG. 5. The transmission shown here corresponds to the transmission according to FIG. 1, with the difference that an electric motor E is arranged in an axially parallel manner to the drive shaft 1, and is connected to the drive shaft 1 through an additional fourth spur gear stage S4. In accordance with FIG. 5, the first spur gear ST1 of the first spur gear stage S1 is used for the third spur gear stage S3, by which the expenditure for the assembly and costs is reduced, since only one additional spur gear ST7 is necessary.

Figure 5:
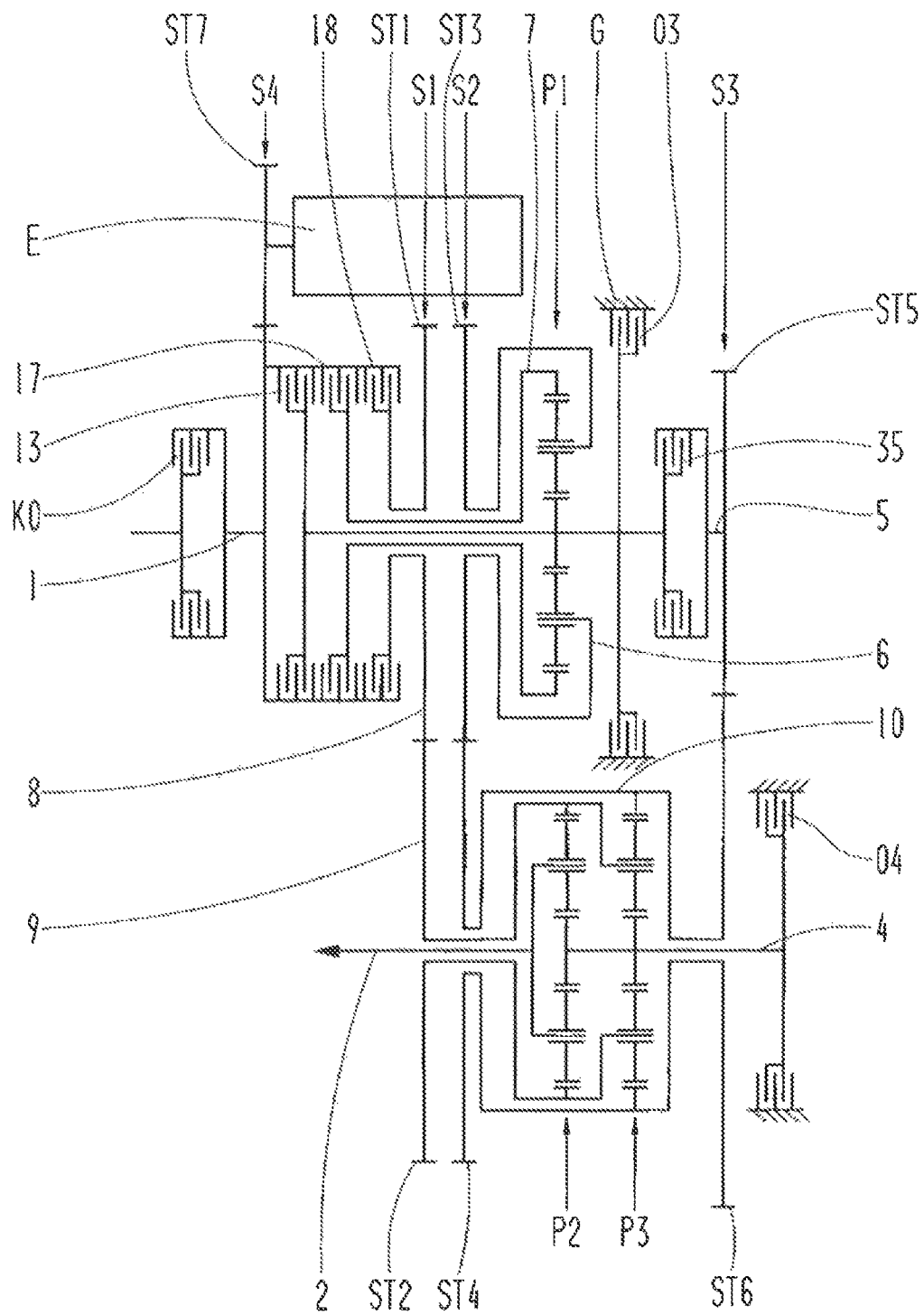
FIG. 5 is a schematic view of an additional embodiment of a hybridized multi-speed transmission based on the embodiment in accordance with FIG. 2.

With the example shown in FIG. 5, a tenth clutch K0 is arranged between the internal combustion engine (not shown) and the drive shaft 1, in order to enable all-electric driving.

Figure 6:
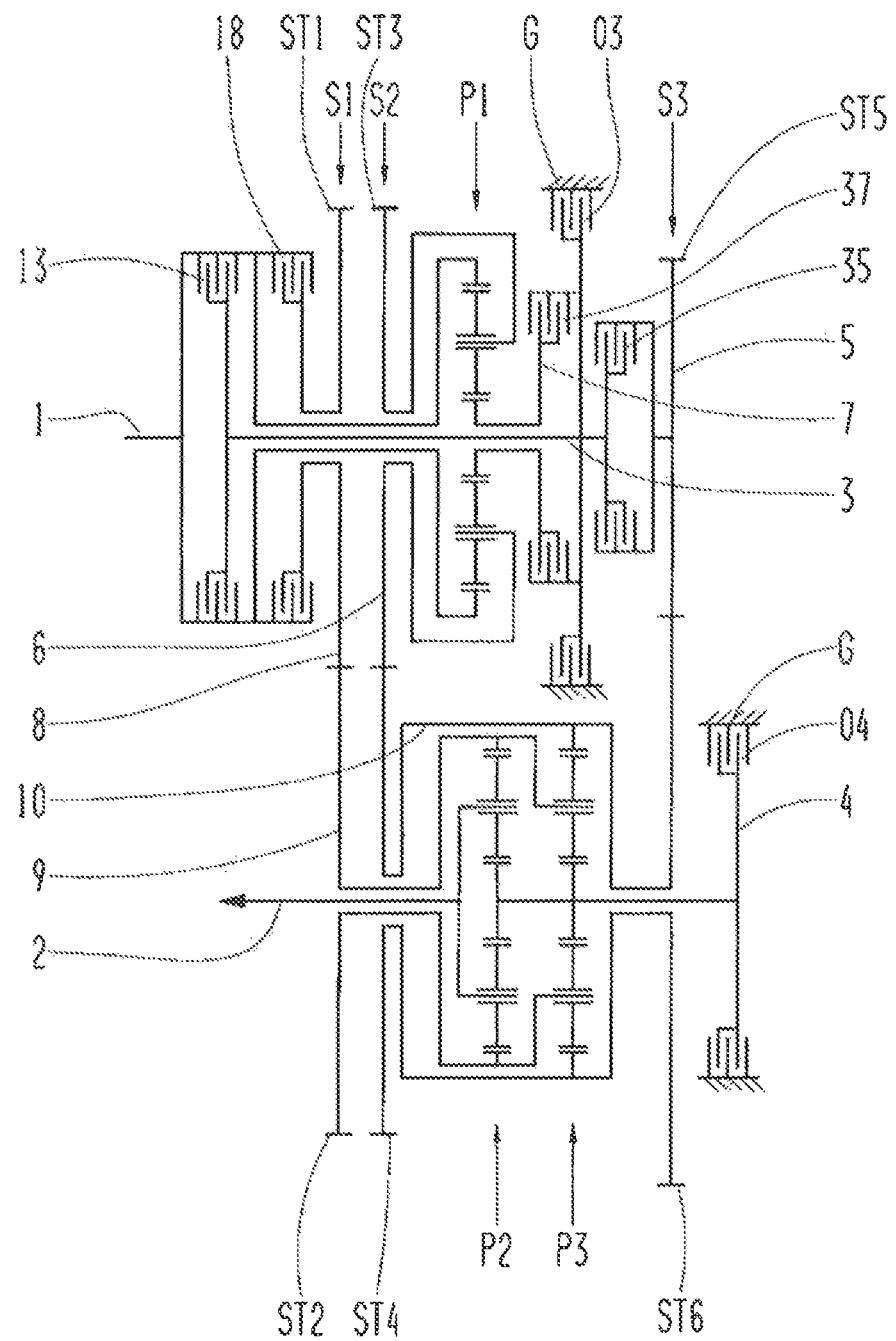
FIG. 6 is a schematic view of an additional preferred embodiment of a multi-speed transmission in accordance with the invention.

With the transmission shown in FIG. 6, the drive shaft 1 is detachably connectable to an eighth shaft 8 through a third clutch 18, which, through a first spur gear stage S1, the first spur gear of which is designated with ST1 and the second spur gear of which is designated with ST2, is in operative connection with a ninth shaft 9 connected to the ring gear of the second planetary gear set P2 and the bar of the third planetary gear set P3. In addition, the drive shaft 1 is detachably connectable to a third shaft 3 through a first clutch 13, whereas the third shaft 3 is attachable to the housing G of the transmission through a first brake 03, is detachably connectable through a seventh clutch 37 to the seventh shaft 7 connected to the sun gear of the first planetary gear set P1 and is detachably connectable through a fourth clutch 35 to a fifth shaft 5, which, through a third spur gear stage S3, the first spur gear of which is designated with ST5 and the second spur gear of which is designated with ST6, which is in operative connection with a tenth shaft 10 connected to the ring gear of the third planetary gear set P3. With the example shown, the drive shaft 1 is directly connected to the ring gear of the first planetary gear set P1.

With reference to FIG. 6, a sixth shaft 6 is connected to the bar of the first planetary gear set P1 and, through a second spur gear stage S2, the first spur gear of which is designated with ST3 and the second spur gear of which is designated with ST4, is in operative connection with the tenth shaft 10 connected to the ring gear of the third planetary gear set P3, whereas the output shaft 2 is connected to the bar of the second planetary gear set P2, and a fourth shaft 4 is connected to the sun gear of the second planetary gear set P2 and the sun gear of the third planetary gear set P3 and is attachable to the housing G through the second brake 04.

Thus, the example shown in FIG. 6 differs from the embodiment according to FIG. 1 by the fact that the drive shaft 1 is directly connected to the ring gear of the first planetary gear set P1, and that the third shaft 3 is not directly connected to the sun gear of the first planetary gear set P1, but is detachably connectable through the seventh shaft 7 and the seventh clutch 37. The example shown in FIG. 2 can be modified analogously to the embodiment according to FIG. 6, such that the drive shaft 1 is directly connected to the ring gear of the first planetary gear set P1, whereas the third shaft 3 is not directly connected to the sun gear of the first planetary gear set P1, but is detachably connectable through the seventh shaft 7 and the seventh clutch 37.

Figure 7:
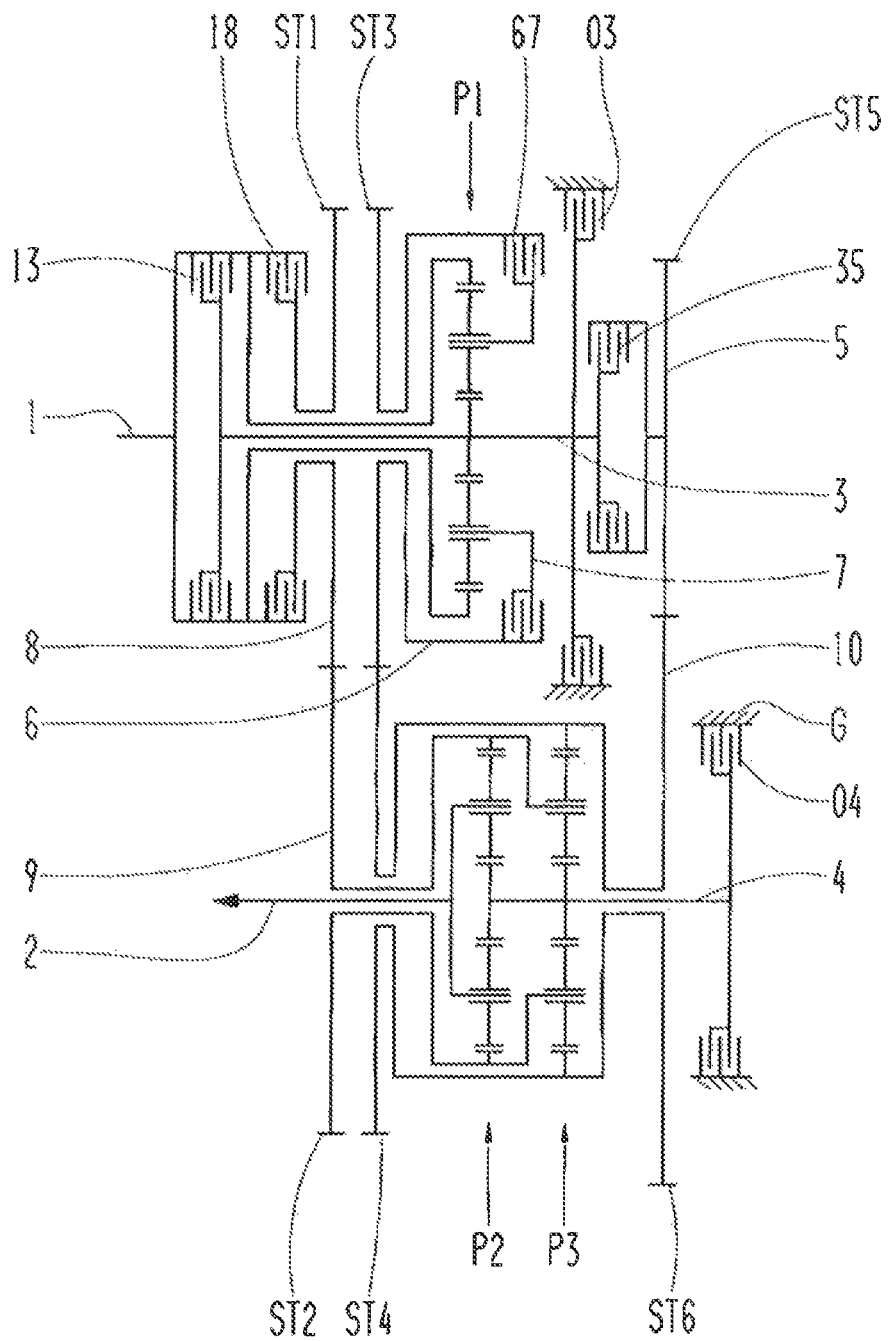
FIG. 7 is a schematic view of an additional preferred embodiment of a multi-speed transmission in accordance with the invention.

According to an additional embodiment of the invention, and with reference to FIG. 7, the drive shaft 1 is detachably connectable to an eighth shaft 8 through a first clutch 18, which, through a first spur gear stage S1, the first spur gear of which is designated with ST1 and the second spur gear of which is designated with ST2, is in operative connection with a ninth shaft 9 connected to the ring gear of the second planetary gear set P2 and the bar of the third planetary gear set P3. In addition, the drive shaft 1 is detachably connectable, through a first clutch 13, with a third shaft 3 connected to the sun gear of the first planetary gear set P1, whereas the third shaft 3 is attachable to the housing G of the transmission through a first brake 03 and is detachably connectable to a fifth shaft 5 through a fourth clutch 35, which, through a third spur gear stage S3, the first spur gear of which is designated with ST5 and the second spur gear of which is designated with ST6, is in operative connection with a tenth shaft 10 connected to the ring gear of the third planetary gear set P3. With the example shown, the drive shaft 1 is directly connected to the ring gear of the first planetary gear set P1.

With reference to FIG. 7, a sixth shaft 6 is detachably connectable through an eighth clutch 67 to a seventh shaft 7 connected to the bar of the first planetary gear set P1 and, through a second spur gear stage S2, the first spur gear of which is designated with ST3 and the second spur gear of which is designated with ST4, is in operative connection with the tenth shaft 10 connected to the ring gear of the third planetary gear set P3, whereas the output shaft 2 is connected to the bar of the second planetary gear set P2, and a fourth shaft 4 is connected to the sun gear of the second planetary gear set P2 and the sun gear of the third planetary gear set P3 and is attachable to the housing G through the second brake 04.

Thus, the example shown in FIG. 7 differs from the embodiment according to FIG. 1 by the fact that the drive shaft 1 is directly connected to the ring gear of the first planetary gear set P1, and that the sixth shaft 6 is not directly connected to the bar of the first planetary gear set P1, but is detachably connectable through the seventh shaft 7 and the eighth clutch 67. The example shown in FIG. 2 can be modified analogously to the embodiment according to FIG. 7, such that the drive shaft 1 is directly connected to the ring gear of the first planetary gear set P1, whereas the sixth shaft 6 is not directly connected to the bar of the first planetary gear set P1, but is detachably connectable through the seventh shaft 7 and the eighth clutch 67.

Figure 8:
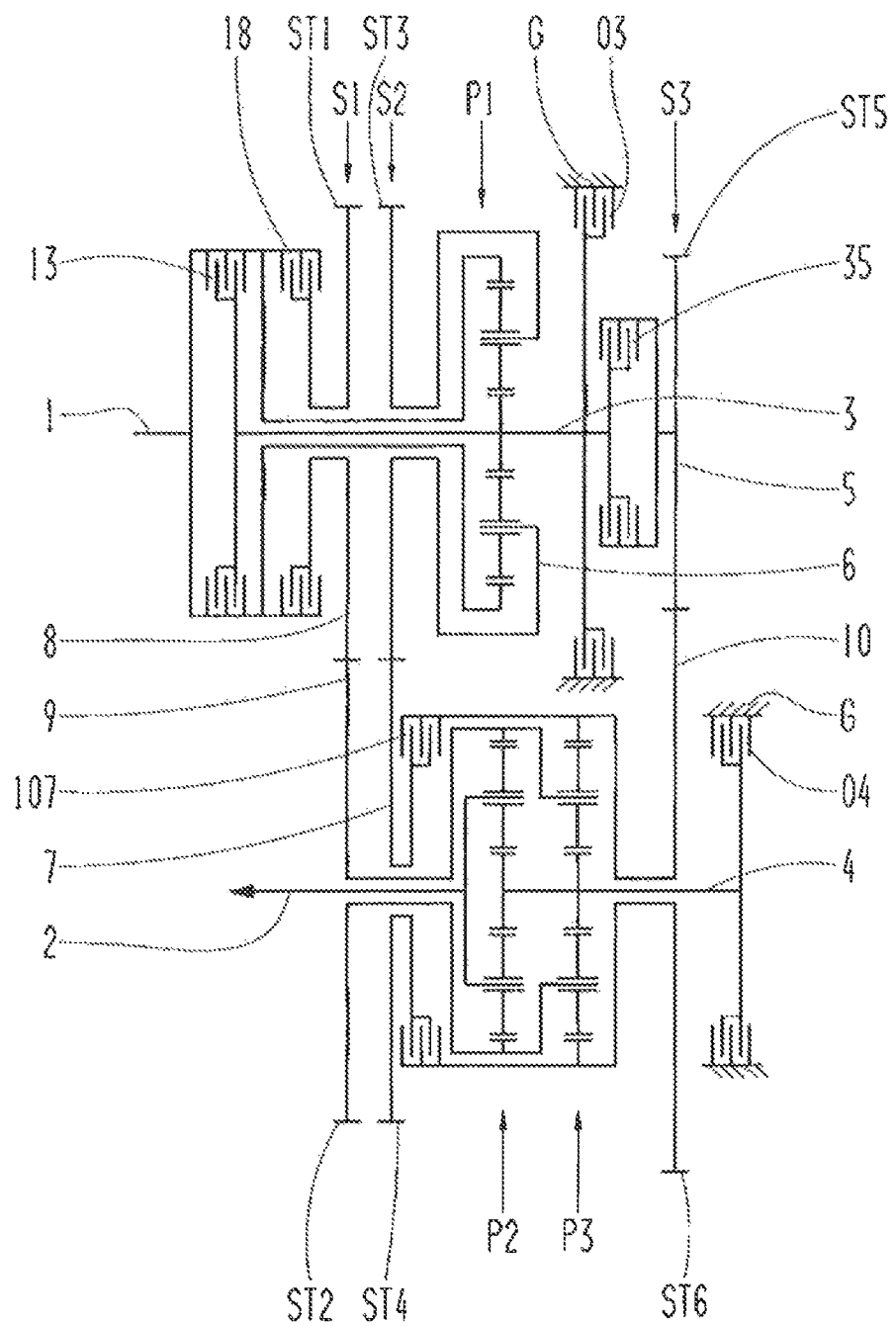
FIG. 8 is a schematic view of an additional preferred embodiment of a multi-speed transmission in accordance with the invention.

According to an additional embodiment of the invention, which is the subject matter of FIG. 8, the drive shaft 1 is detachably connectable to an eighth shaft 8 through a third clutch 18, which, through a first spur gear stage S1, is in operative connection with a ninth shaft 9 connected to the ring gear of the second planetary gear set P2 and the bar of the third planetary gear set P3. In addition, the drive shaft 1 is detachably connectable, through a first clutch 13, with a third shaft 3 connected to the sun gear of the first planetary gear set P1, whereas the third shaft 3 is attachable to the housing G of the transmission through a first brake 03 and is detachably connectable to a fifth shaft 5 through a fourth clutch 35, which, through a third spur gear stage S3, is in operative connection with a tenth shaft 10 connected to the ring gear of the third planetary gear set P3. Thereby, the drive shaft 1 is directly connected to the ring gear of the first planetary gear set P1.

In addition, through a second spur gear stage S2, a sixth shaft 6 connected to the bar of the first planetary gear set P1 is in operative connection with a seventh shaft 7, which, through a ninth clutch 107, is detachably connectable to the tenth shaft 10 connected to the ring gear of the third planetary gear set P3, whereas the output shaft 2 is connected to the bar of the second planetary gear set P2, and a fourth shaft 4 is connected to the sun gear of the second planetary gear set P2 and the sun gear of the third planetary gear set P3 and is attachable to the housing G through a second brake 04.

Thus, the example shown in FIG. 8 differs from the embodiment according to FIG. 1 by the fact that the drive shaft 1 is directly connected to the ring gear of the first planetary gear set P1, and that the sixth shaft 6 is not directly in operative connection with the tenth shaft 10 through the second spur gear stage S2, but can be in detachable operative connection through the second spur gear stage S2, the seventh shaft 7 and the ninth clutch 107. The example shown in FIG. 2 can be modified analogously to the embodiment according to FIG. 8, such that the drive shaft 1 is directly connected to the ring gear of the first planetary gear set P1, whereas the sixth shaft 6 is not directly in operative connection with the tenth shaft 10, but can be in detachable operative connection through the second spur gear stage S2, the seventh shaft 7 and the ninth clutch 107.

The shift diagrams for the transmission according to FIGS. 6, 7 and 8 correspond to the shift diagram in accordance with FIG. 2, whereas the second clutch 17 is replaced by the seventh, eighth or ninth clutch 37, 67 107.

All embodiments in accordance with the invention can be hybridized analogously to the examples according to FIG. 4 and FIG. 5.

In principle, an electric motor or an additional source of drive can be arranged at each shaft of the transmission in accordance with the invention.

In accordance with the invention, it is possible to provide additional freewheels at each suitable location of the multi-speed transmission, for example between one shaft and the housing, or, if applicable, in order to connect two shafts.

In accordance with the invention, an axle differential and/or a distributor differential may be arranged on the input side or on the output side.

Within the framework of an advantageous additional form of the invention, if necessary, the drive shaft 1 may be separated from the drive motor by a coupling element, whereas a hydrodynamic converter, a hydraulic clutch, a dry starting clutch, a wet starting clutch, a magnetic powder clutch or a centrifugal clutch may be used as the coupling element. It is also possible to arrange such a start-up element in the direction of the power flow behind the transmission, whereas, in this case, the drive shaft 1 is constantly connected to the crankshaft of the drive motor.

The multi-speed transmission in accordance with the invention also allows for the arrangement of a torsional vibration damper between the drive motor and the transmission.

Within the framework of an additional embodiment of the invention that is not shown, a wear-free brake, such as a hydraulic retarder or an electric retarder or the like, may be arranged at each shaft, preferably at the drive shaft 1 or the output shaft 2; this is of particular importance for use in commercial vehicles. Furthermore, a power take-off may be provided for the drive of additional power units at each shaft, preferably at the drive shaft 1 or the output shaft 2.

The frictional shift elements that are used may be formed as power-shiftable clutches or brakes. In particular, force-fitting couplings or brakes, such as multi-disk couplings, band brakes and/or cone couplings, may be used. In addition, the shift elements that are used may be designed as positive-locking shift elements.

Modifications and variations can be made to the embodiments illustrated or described herein without departing from the scope and spirit of the invention as set forth in the appended claims.

REFERENCE SIGNS

1 First shaft, drive shaft
2 Second shaft, output shaft
3 Third shaft
4 Fourth shaft
5 Fifth shaft
6 Sixth shaft
7 Seventh shaft
8 Eighth shaft
9 Ninth shaft
10 Tenth shaft
03 First brake
04 Second brake
13 First clutch
15 Sixth clutch
17 Second clutch
18 Third clutch
35 Fourth clutch
37 Seventh clutch
67 Eighth clutch 89 Fifth clutch
107 Ninth clutch
E Electric motor
G Housing
K0 Tenth clutch
P1 First planetary gear set
P2 Second planetary gear set
P3 Third planetary gear set
S1 First spur gear stage
S2 Second spur gear stage
S3 Third spur gear stage
S4 Fourth spur gear stage
ST1 First spur gear of the first spur gear stage S1
ST2 Second spur gear of the first spur gear stage S1
ST3 First spur gear of the second spur gear stage S2
ST4 Second spur gear of the second spur gear stage S2
ST5 First spur gear of the third spur gear stage S3
ST6 Second spur gear of the third spur gear stage S3
ST7 Spur gear of the fourth spur gear stage S3
i Transmission ratio
φ Progressive step
M4' Combination
M4" Combination
M4'" Combination

The invention claimed is:

1. An automatic multistage transmission for a motor vehicle, comprising:
    a drive shaft (1);
    an output shaft (2) arranged parallel to the drive shaft (1);
    a first planetary gear set (P1), a second planetary gear set (P2), and a third planetary gear set (P3), the first planetary gear set (P1) arranged coaxial to a first axis defined by the drive shaft (1), and the second and third planetary gear sets (P2, P3) arranged coaxial to a second axis that is arranged parallel to the first axis and is defined by the output shaft (2);
    the drive shaft (1) detachably connectable through a first clutch (13) to a third shaft (3) connected to a sun gear of the first planetary gear set (P1), which is attachable to a housing (G) of the transmission through a first brake (03);
    the drive shaft (1) detachably connectable through a second clutch (17) to a seventh shaft (7) connected to a ring gear of the first planetary gear set (P1);
    a sixth shaft (6) connected to a bar of the first planetary gear set (P1) and, through a second spur gear stage (S2), with a tenth shaft (10) connected to a ring gear of the third planetary gear set (P3);
    the output shaft (2) connected to bar of the second planetary gear set (P2);
    a fourth shaft (4) connected to a sun gear of the second planetary gear set (P2) and the sun gear of the third planetary gear set (P3), and attachable to the housing G through a second brake (04);
    the drive shaft (1), through an eighth and a ninth shaft (8, 9), a first spur gear stage (S1), and through one of a) a third clutch (18) or b) a fifth clutch (89), is in operative connection with a ring gear of the second planetary gear set (P2) and a bar of the third planetary gear set (P3); and
    wherein the third shaft (3), through a fifth and tenth shaft (5, 10), a third spur gear stage (S3), and through one of a) a fourth clutch (35) or b) a sixth clutch (15), is in operative connection with the ring gear of the third planetary gear set (P3).

2. The multistage transmission according to claim 1, wherein the drive shaft (1) is detachably connectable through the third clutch (18) with the eighth shaft (8), which, through the first spur gear stage (S1), is in operative connection with the ninth shaft (9) connected to the ring gear of the second planetary gear set (P2) and the bar of the third planetary gear set (P3).

3. The multistage transmission according to claim 1, wherein the drive shaft (1) is in operative connection, through the first spur gear stage (S1), with the eighth shaft (8), which, through the fifth clutch (89), is detachably connectable to the ninth shaft (9) connected to the ring gear of the second planetary gear set (P2) and the bar of the third planetary gear set (P3).

4. The multistage transmission according to claim 2, wherein the third shaft (3) is detachably connectable, through the fourth clutch (35), to the fifth shaft (5), which, through the third spur gear stage (S3), is in operative connection with the tenth shaft (10) connected to the ring gear of the third planetary gear set (P3).

5. The multistage transmission according to claim 2, wherein the third shaft (3) is in operative connection, through the third spur gear stage (S3), to the fifth shaft (5), which, through a sixth clutch (15), is detachably connectable to the tenth shaft (10) connected to the ring gear of the third planetary gear set (P3).

6. The multistage transmission according to claim 1, wherein the planetary gear sets (P1, P2, P3, P4) are designed as negative planetary gear sets.

7. The multistage transmission according to claim 1, further comprising an electric motor (E) that is one of a) directly connected to the drive shaft (1) or b) axially parallel to and connected to the drive shaft (1) through either a spur gear stage (S4) or a chain drive.

8. The multistage transmission according to claim 7, wherein the transmission is drivable by the electric motor in all gears, and further comprising a tenth clutch (K0), wherein an internal combustion engine of the motor vehicle is connectable to the transmission by the tenth clutch (K0).

9. The multistage transmission according to claim 1, wherein the transmission comprises nine forward gears and one reverse gear;
    the drive shaft (1) is detachably connectable, through the second clutch (17), to the seventh shaft (7) connected to the ring gear of the first planetary gear set (P1);
    the third shaft (3) is detachably connectable, through the fourth clutch (35), to the fifth shaft (5), which is in operative connection, through the third spur gear stage (S3), with the tenth shaft (10) connected to the ring gear of the third planetary gear set (P3);
    the drive shaft (1) is detachably connectable, through the third clutch (18), to the eighth shaft (8), which is in operative connection, through the first spur gear stage (S1), to the ninth shaft (9) connected to the ring gear of the second planetary gear set (P2) and the bar of the third planetary gear set (P3);
    wherein the first forward gear arises through locking of the second brake (04) and the second and fourth clutches (17, 35);
    wherein the second forward gear arises through locking of the first and second brakes (03, 04) and the second clutch (17);
    wherein the third forward gear arises through locking of the second brake (04) and the first and second clutches (13, 17);
    wherein the fourth forward gear arises through locking of the second brake (04) and the second and third clutches (17, 18);

wherein the fifth forward gear arises through locking of the first, second and third clutches (13, 17, 18);

wherein the sixth forward gear arises through locking of the first brake (03) and the second and third clutches (17, 18);

wherein the seventh forward gear arises through locking of the second, third and fourth clutches (17, 18, 35);

wherein the eighth gear arises through locking of the first brake (03) and the third and fourth clutches (18, 35);

wherein the ninth forward gear arises through locking of the first, third, and fourth clutches (13, 18, 35);

wherein the reverse gear arises through locking of the second brake (04) and the first and fourth clutches (13, 35);

wherein the fourth forward gear alternatively is realized through one of a) locking of the second brake (04) and the third and fourth clutches (18, 35), b) locking of the second brake (04) and the first and third clutches (13, 18), or c) locking of the first and second brakes (03, 04) and the third clutch (18);

wherein in the event that the drive shaft (1) is in operative connection through the first spur gear stage (S1) with the eighth shaft (8), which is detachably connectable through the fifth clutch (89) to the ninth shaft (9) connected to the ring gear of the third planetary gear set (P3) and the bar of the fourth planetary gear set (P4), the third clutch (18) is replaced by the fifth clutch (89);

wherein in the event that the third shaft (3) is in operative connection through the spur gear stage (S3) with the fifth shaft (5), which, through a sixth clutch (15), is detachably connectable to the tenth shaft (10) connected to the ring gear of the third planetary gear set (P3), the fourth clutch (35) is replaced by the sixth clutch (15);

wherein in the event that a seventh clutch (37) is provided, the second clutch (17) is replaced by the seventh clutch (37);

wherein in the event that an eighth clutch (67) is provided, the second clutch (17) is replaced by the eighth clutch (67); and wherein in the event that a ninth clutch (107) is provided, the second clutch (17) is replaced by the ninth clutch (107).

10. An automatic multistage transmission for a motor vehicle, comprising:
a drive shaft (1);
an output shaft (2) arranged parallel to the drive shaft (1);
a first planetary gear set (P1), a second planetary gear set (P2), and a third planetary gear set (P3), the first planetary gear set (P1) arranged coaxial to a first axis defined by the drive shaft (1), and the second and third planetary gear sets (P2, P3) arranged coaxial to a second axis that is arranged parallel to the first axis and is defined by the output shaft (2);
the drive shaft (1) connected to a ring gear of the first planetary gear set (P1) and detachably connectable through a first clutch (13) to a third shaft (3), which is attachable to a housing (G) of the transmission through a first brake (03);
the drive shaft (1) detachably connectable through a second clutch (17) to a seventh shaft (7) connected to a sun gear of the first planetary gear set (P1);
a sixth shaft (6) connected to a bar of the first planetary gear set (P1) and, through a second spur gear stage (S2), with a tenth shaft (10) connected to a ring gear of the third planetary gear set (P3);
the output shaft (2) connected to bar of the second planetary gear set (P2);
a fourth shaft (4) connected to a sun gear of the second planetary gear set (P2) and the sun gear of the third planetary gear set (P3), and attachable to the housing G through a second brake (04);
the drive shaft (1), through an eighth and a ninth shaft (8, 9), a first spur gear stage (S1), and through one of a) a third clutch (18) or b) a fifth clutch (89) and, is in operative connection with a ring gear of the second planetary gear set (P2) and a bar of the third planetary gear set (P3); and
wherein the third shaft (3), through a fifth and tenth shaft (5, 10), a third spur gear stage (S3), and through one of a) a fourth clutch (35) or b), a sixth clutch (15), is in operative connection with the ring gear of the third planetary gear set (P3).

11. The multistage transmission according to claim 10, wherein the drive shaft (1) is detachably connectable through the third clutch (18) with the eighth shaft (8), which, through the first spur gear stage (S1), is in operative connection with the ninth shaft (9) connected to the ring gear of the second planetary gear set (P2) and the bar of the third planetary gear set (P3).

12. The multistage transmission according to claim 10, wherein the drive shaft (1) is in operative connection, through the first spur gear stage (S1), with the eighth shaft (8), which, through the fifth clutch (89), is detachably connectable to the ninth shaft (9) connected to the ring gear of the second planetary gear set (P2) and the bar of the third planetary gear set (P3).

13. The multistage transmission according to claim 11, wherein the third shaft (3) is detachably connectable, through the fourth clutch (35), to the fifth shaft (5), which, through the third spur gear stage (S3), is in operative connection with the tenth shaft (10) connected to the ring gear of the third planetary gear set (P3).

14. The multistage transmission according to claim 11, wherein the third shaft (3) is in operative connection, through the third spur gear stage (S3), to the fifth shaft (5), which, through a sixth clutch (15), is detachably connectable to the tenth shaft (10) connected to the ring gear of the third planetary gear set (P3).

15. The multistage transmission according to claim 10, wherein the planetary gear sets (P1, P2, P3, P4) are designed as negative planetary gear sets.

16. The multistage transmission according to claim 10, further comprising an electric motor (E) that is either directly connected to the drive shaft (1) or axially parallel to and connected to the drive shaft (1) through a spur gear stage (S4) or a chain drive.

17. The multistage transmission according to claim 16, wherein the transmission is drivable by the electric motor in all gears, and further comprising a tenth clutch (K0), wherein an internal combustion engine of the motor vehicle is connectable to the transmission by the tenth clutch (K0).

18. The multistage transmission according to claim 10, wherein the transmission comprises nine forward gears and one reverse gear;
the drive shaft (1) is detachably connectable, through the second clutch (17), to the seventh shaft (7) connected to the ring gear of the first planetary gear set (P1);
the third shaft (3) is detachably connectable, through the fourth clutch (35), to the fifth shaft (5), which is in operative connection, through the third spur gear stage (S3), with the tenth shaft (10) connected to the ring gear of the third planetary gear set (P3);

the drive shaft (1) is detachably connectable, through the third clutch (18), to the eighth shaft (8), which is in operative connection, through the first spur gear stage (S1), to the ninth shaft (9) connected to the ring gear of the second planetary gear set (P2) and the bar of the third planetary gear set (P3);

wherein the first forward gear arises through locking of the second brake (04) and the second and fourth clutches (17, 35);

wherein the second forward gear arises through locking of the first and second brakes (03, 04) and the second clutch (17);

wherein the third forward gear arises through locking of the second brake (04) and the first and second clutches (13, 17);

wherein the fourth forward gear arises through locking of the second brake (04) and the second and third clutches (17, 18);

wherein the fifth forward gear arises through locking of the first, second and third clutches (13, 17, 18);

wherein the sixth forward gear arises through locking of the first brake (03) and the second and third clutches (17, 18);

wherein the seventh forward gear arises through locking of the second, third and fourth clutches (17, 18, 35);

wherein the eighth gear arises through locking of the first brake (03) and the third and fourth clutches (18, 35);

wherein the ninth forward gear arises through locking of the first, third, and fourth clutches (13, 18, 35);

wherein the reverse gear arises through locking of the second brake (04) and the first and fourth clutches (13, 35);

wherein the fourth forward gear alternatively is realized through one of a) locking of the second brake (04) and the third and fourth clutches (18, 35), b) locking of the second brake (04) and the first and third clutches (13, 18), or c) locking of the first and second brakes (03, 04) and the third clutch (18);

wherein in the event that the drive shaft (1) is in operative connection through the first spur gear stage (S1) with the eighth shaft (8), which is detachably connectable through the fifth clutch (89) to the ninth shaft (9) connected to the ring gear of the third planetary gear set (P3) and the bar of the fourth planetary gear set (P4), the third clutch (18) is replaced by the fifth clutch (89);

wherein in the event that the third shaft (3) is in operative connection through the spur gear stage (S3) with the fifth shaft (5), which, through a sixth clutch (15), is detachably connectable to the tenth shaft (10) connected to the ring gear of the third planetary gear set (P3), the fourth clutch (35) is replaced by the sixth clutch (15);

wherein in the event that a seventh clutch (37) is provided, the second clutch (17) is replaced by the seventh clutch (37);

wherein in the event that an eighth clutch (67) is provided, the second clutch (17) is replaced by the eighth clutch (67); and wherein in the event that a ninth clutch (107) is provided, the second clutch (17) is replaced by the ninth clutch (107).

19. An automatic multistage transmission for a motor vehicle, comprising:
a drive shaft (1);
an output shaft (2) arranged parallel to the drive shaft (1);
a first planetary gear set (P1), a second planetary gear set (P2), and a third planetary gear set (P3), the first planetary gear set (P1) arranged coaxial to a first axis defined by the drive shaft (1), and the second and third planetary gear sets (P2, P3) arranged coaxial to a second axis that is arranged parallel to the first axis and is defined by the output shaft (2);

the drive shaft (1) connected to a ring gear of the first planetary gear set (P1) and detachably connectable through a first clutch (13) to a third shaft (3), which is attachable to a housing (G) of the transmission through a first brake (03);

a sixth shaft (6) detachably connectable through an eighth clutch (67) with a seventh shaft (7) connected to a bar of the first planetary gear set (P1) and, through a second spur gear stage (S2), is in operative connection with a tenth shaft (10) connected to a ring gear of the third planetary gear set (P3);

the output shaft (2) connected to a bar of the second planetary gear set (P2);

a fourth shaft (4) is connected to a sun gear of the second planetary gear set (P2) and a sun gear of the third planetary gear set (P3), and attachable to the housing (G) through a second brake (04);

the drive shaft (1), through an eighth and a ninth shaft (8, 9), a first spur gear stage (S1), and through one of a) a third clutch (18) or b) a fifth clutch (89), in operative connection with a ring gear of the second planetary gear set (P2) and a bar of the third planetary gear set (P3); and the third shaft (3), through a fifth and tenth shaft (5, 10), a third spur gear stage (S3), and through one of a) a fourth clutch (35) or b) a sixth clutch (15), is in operative connection with the ring gear of the third planetary gear set (P3).

20. The multistage transmission according to claim 19, wherein the drive shaft (1) is detachably connectable through the third clutch (18) with the eighth shaft (8), which, through the first spur gear stage (S1), is in operative connection with the ninth shaft (9) connected to the ring gear of the second planetary gear set (P2) and the bar of the third planetary gear set (P3).

21. The multistage transmission according to claim 20, wherein the drive shaft (1) is in operative connection, through the first spur gear stage (S1), with the eighth shaft (8), which, through the fifth clutch (89), is detachably connectable to the ninth shaft (9) connected to the ring gear of the second planetary gear set (P2) and the bar of the third planetary gear set (P3).

22. The multistage transmission according to claim 20, wherein the third shaft (3) is detachably connectable, through the fourth clutch (35), to the fifth shaft (5), which, through the third spur gear stage (S3), is in operative connection with the tenth shaft (10) connected to the ring gear of the third planetary gear set (P3).

23. The multistage transmission according to claim 20, wherein the third shaft (3) is in operative connection, through the third spur gear stage (S3), to the fifth shaft (5), which, through a sixth clutch (15), is detachably connectable to the tenth shaft (10) connected to the ring gear of the third planetary gear set (P3).

24. The multistage transmission according to claim 19, wherein the planetary gear sets (P1, P2, P3, P4) are designed as negative planetary gear sets.

25. The multistage transmission according to claim 19, further comprising an electric motor (E) that is one of a) directly connected to the drive shaft (1) or b) axially parallel to and connected to the drive shaft (1) through either a spur gear stage (S4) or a chain drive.

26. The multistage transmission according to claim 25, wherein the transmission is drivable by the electric motor in all gears, and further comprising a tenth clutch (K0), wherein an internal combustion engine of the motor vehicle is connectable to the transmission by the tenth clutch (K0).

27. The multistage transmission according to claim 19, wherein the transmission comprises nine forward gears and one reverse gear;
the drive shaft (1) is detachably connectable, through the second clutch (17), to the seventh shaft (7) connected to the ring gear of the first planetary gear set (P1);
the third shaft (3) is detachably connectable, through the fourth clutch (35), to the fifth shaft (5), which is in operative connection, through the third spur gear stage (S3), with the tenth shaft (10) connected to the ring gear of the third planetary gear set (P3);
the drive shaft (1) is detachably connectable, through the third clutch (18), to the eighth shaft (8), which is in operative connection, through the first spur gear stage (S1), to the ninth shaft (9) connected to the ring gear of the second planetary gear set (P2) and the bar of the third planetary gear set (P3);
wherein the first forward gear arises through locking of the second brake (04) and the second and fourth clutches (17, 35);
wherein the second forward gear arises through locking of the first and second brakes (03, 04) and the second clutch (17);
wherein the third forward gear arises through locking of the second brake (04) and the first and second clutches (13, 17);
wherein the fourth forward gear arises through locking of the second brake (04) and the second and third clutches (17, 18);
wherein the fifth forward gear arises through locking of the first, second and third clutches (13, 17, 18);
wherein the sixth forward gear arises through locking of the first brake (03) and the second and third clutches (17, 18);
wherein the seventh forward gear arises through locking of the second, third and fourth clutches (17, 18, 35);
wherein the eighth gear arises through locking of the first brake (03) and the third and fourth clutches (18, 35);
wherein the ninth forward gear arises through locking of the first, third, and fourth clutches (13, 18, 35);
wherein the reverse gear arises through locking of the second brake (04) and the first and fourth clutches (13, 35);
wherein the fourth forward gear alternatively is realized through one of a) locking of the second brake (04) and the third and fourth clutches (18, 35), b) locking of the second brake (04) and the first and third clutches (13, 18), or c) locking of the first and second brakes (03, 04) and the third clutch (18);
wherein in the event that the drive shaft (1) is in operative connection through the first spur gear stage (S1) with the eighth shaft (8), which is detachably connectable through the fifth clutch (89) to the ninth shaft (9) connected to the ring gear of the third planetary gear set (P3) and the bar of the fourth planetary gear set (P4), the third clutch (18) is replaced by the fifth clutch (89);
wherein in the event that the third shaft (3) is in operative connection through the spur gear stage (S3) with the fifth shaft (5), which, through a sixth clutch (15), is detachably connectable to the tenth shaft (10) connected to the ring gear of the third planetary gear set (P3), the fourth clutch (35) is replaced by the sixth clutch (15);
wherein in the event that a seventh clutch (37) is provided, the second clutch (17) is replaced by the seventh clutch (37);
wherein in the event that an eighth clutch (67) is provided, the second clutch (17) is replaced by the eighth clutch (67); and
wherein in the event that a ninth clutch (107) is provided, the second clutch (17) is replaced by the ninth clutch (107).

28. An automatic multistage transmission for a motor vehicle, comprising:
a drive shaft (1);
an output shaft (2) arranged parallel to the drive shaft (1);
a first planetary gear set (P1), a second planetary gear set (P2), and a third planetary gear set (P3), the first planetary gear set (P1) arranged coaxial to a first axis defined by the drive shaft (1), and the second and third planetary gear sets (P2, P3) arranged coaxial to a second axis that is arranged parallel to the first axis and is defined by the output shaft (2);
the drive shaft (1) is connected to a ring gear of the first planetary gear set (P1) and is detachably connectable through a first clutch (13) to a third shaft (3) connected to a sun gear of the first planetary gear set (P1), which is attachable to a housing (G) of the transmission through a first brake (03);
a sixth shaft (6) is connected to a bar of the first planetary gear set (P1) and, through a second spur gear stage (S2), is in operative connection with a seventh shaft (7), which is detachably connectable through a ninth clutch (107) with a tenth shaft (10) connected to a ring gear of the third planetary gear set (P3);
the output shaft (2) connected to a bar of the second planetary gear set (P2);
a fourth shaft (4) connected to a sun gear of the second planetary gear set (P2) and a sun gear of the third planetary gear set (P3), and attachable to the housing (G) through a second brake (04);
the input shaft (1), through an eighth and a ninth shaft (8, 9), a first spur gear stage (S1), and through one of a) a third clutch (18) or b) a fifth clutch (89), is in operative connection with the a gear of the second planetary gear set (P2) and a bar of the third planetary gear set (P3); and
wherein the third shaft (3), through a fifth and tenth shaft (5, 10), a third spur gear stage (S3), and through one of a) a fourth clutch (35) or b) a sixth clutch (15), is in operative connection with a ring gear of the third planetary gear set (P3).

29. The multistage transmission according to claim 28, wherein the drive shaft (1) is detachably connectable through the third clutch (18) with the eighth shaft (8), which, through the first spur gear stage (S1), is in operative connection with the ninth shaft (9) connected to the ring gear of the second planetary gear set (P2) and the bar of the third planetary gear set (P3).

30. The multistage transmission according to claim 28, wherein the drive shaft (1) is in operative connection, through the first spur gear stage (S1), with the eighth shaft (8), which, through the fifth clutch (89), is detachably connectable to the ninth shaft (9) connected to the ring gear of the second planetary gear set (P2) and the bar of the third planetary gear set (P3).

31. The multistage transmission according to claim 29, wherein the third shaft (3) is detachably connectable, through the fourth clutch (35), to the fifth shaft (5), which, through the third spur gear stage (S3), is in operative connection with the tenth shaft (10) connected to the ring gear of the third planetary gear set (P3).

32. The multistage transmission according to claim 29, wherein the third shaft (3) is in operative connection, through the third spur gear stage (S3), to the fifth shaft (5), which, through a sixth clutch (15), is detachably connectable to the tenth shaft (10) connected to the ring gear of the third planetary gear set (P3).

33. The multistage transmission according to claim 28, wherein the planetary gear sets (P1, P2, P3, P4) are designed as negative planetary gear sets.

34. The multistage transmission according to claim 28, further comprising an electric motor (E) that is either directly connected to the drive shaft (1) or axially parallel to and connected to the drive shaft (1) through a spur gear stage (S4) or a chain drive.

35. The multistage transmission according to claim 34, wherein the transmission is drivable by the electric motor in all gears, and further comprising a tenth clutch (K0), wherein an internal combustion engine of the motor vehicle is connectable to the transmission by the tenth clutch (K0).

36. The multistage transmission according to claim 28, wherein the transmission comprises nine forward gears and one reverse gear;
the drive shaft (1) is detachably connectable, through the second clutch (17), to the seventh shaft (7) connected to the ring gear of the first planetary gear set (P1);
the third shaft (3) is detachably connectable, through the fourth clutch (35), to the fifth shaft (5), which is in operative connection, through the third spur gear stage (S3), with the tenth shaft (10) connected to the ring gear of the third planetary gear set (P3);
the drive shaft (1) is detachably connectable, through the third clutch (18), to the eighth shaft (8), which is in operative connection, through the first spur gear stage (S1), to the ninth shaft (9) connected to the ring gear of the second planetary gear set (P2) and the bar of the third planetary gear set (P3);
wherein the first forward gear arises through locking of the second brake (04) and the second and fourth clutches (17, 35);
wherein the second forward gear arises through locking of the first and second brakes (03, 04) and the second clutch (17);
wherein the third forward gear arises through locking of the second brake (04) and the first and second clutches (13, 17);
wherein the fourth forward gear arises through locking of the second brake (04) and the second and third clutches (17, 18);
wherein the fifth forward gear arises through locking of the first, second and third clutches (13, 17, 18);
wherein the sixth forward gear arises through locking of the first brake (03) and the second and third clutches (17, 18);
wherein the seventh forward gear arises through locking of the second, third and fourth clutches (17, 18, 35);
wherein the eighth gear arises through locking of the first brake (03) and the third and fourth clutches (18, 35);
wherein the ninth forward gear arises through locking of the first, third, and fourth clutches (13, 18, 35);
wherein the reverse gear arises through locking of the second brake (04) and the first and fourth clutches (13, 35);
wherein the fourth forward gear alternatively is realized through one of a) locking of the second brake (04) and the third and fourth clutches (18, 35), b) locking of the second brake (04) and the first and third clutches (13, 18), or c) locking of the first and second brakes (03, 04) and the third clutch (18);
wherein in the event that the drive shaft (1) is in operative connection through the first spur gear stage (S1) with the eighth shaft (8), which is detachably connectable through the fifth clutch (89) to the ninth shaft (9) connected to the ring gear of the third planetary gear set (P3) and the bar of the fourth planetary gear set (P4), the third clutch (18) is replaced by the fifth clutch (89);
wherein in the event that the third shaft (3) is in operative connection through the spur gear stage (S3) with the fifth shaft (5), which, through a sixth clutch (15), is detachably connectable to the tenth shaft (10) connected to the ring gear of the third planetary gear set (P3), the fourth clutch (35) is replaced by the sixth clutch (15);
wherein in the event that a seventh clutch (37) is provided, the second clutch (17) is replaced by the seventh clutch (37);
wherein in the event that an eighth clutch (67) is provided, the second clutch (17) is replaced by the eighth clutch (67); and
wherein in the event that a ninth clutch (107) is provided, the second clutch (17) is replaced by the ninth clutch (107).

* * * * *